United States Patent [19]

Tsuda et al.

[11] Patent Number: 5,325,911
[45] Date of Patent: *Jul. 5, 1994

[54] METHOD OF PRODUCING FE-NI SERIES ALLOYS HAVING IMPROVED EFFECT FOR RESTRAINING STREAKS DURING ETCHING

[75] Inventors: Masaomi Tsuda; Toshihiko Taniuchi, both of Kanagawa, Japan

[73] Assignee: Nippon Yakin Kogyo Co., Ltd., Tokyo, Japan

[*] Notice: The portion of the term of this patent subsequent to Mar. 26, 2008 has been disclaimed.

[21] Appl. No.: 686,847

[22] Filed: Apr. 17, 1991

Related U.S. Application Data

[63] Continuation of Ser. No. 389,991, Aug. 7, 1989, abandoned.

[30] Foreign Application Priority Data

Aug. 19, 1988 [JP] Japan ................ 63-204621
Aug. 19, 1988 [JP] Japan ................ 63-204622

[51] Int. Cl.$^5$ ................ B22D 11/00; B22D 25/06
[52] U.S. Cl. ................ 164/477; 164/473; 148/541
[58] Field of Search ............ 164/470, 477, 468, 473, 164/459; 148/2, 3, 541

[56] References Cited

U.S. PATENT DOCUMENTS

| | | | |
|---|---|---|---|
| 3,478,808 | 11/1969 | Adams | 164/453 |
| 3,770,047 | 11/1973 | Kirkpatrick | 164/122.1 |
| 3,952,791 | 4/1976 | Ito et al. | 164/468 |
| 4,030,534 | 6/1977 | Ito et al. | 164/504 |
| 4,213,497 | 7/1980 | Sawyer | 164/122.2 |
| 4,331,196 | 5/1982 | Ohashi et al. | 164/468 |
| 4,436,485 | 3/1984 | Vonnegut | 164/122.1 |
| 4,466,842 | 8/1984 | Yada et al. | 148/12 R |
| 4,515,644 | 5/1985 | Sawatani et al. | 148/12 EA |
| 4,573,515 | 3/1986 | Kitamura et al. | 164/468 |
| 4,671,335 | 6/1987 | Ayata et al. | 164/468 |
| 4,832,112 | 5/1989 | Brinegar | 164/499 |
| 4,864,188 | 9/1989 | Sugai | 312/402 |
| 5,002,619 | 3/1991 | Tsuda | 148/11.5 R |

FOREIGN PATENT DOCUMENTS

| | | |
|---|---|---|
| 0101919 | 3/1984 | European Pat. Off. . |
| 61-201733 | 9/1986 | Japan . |
| 61-201757 | 9/1986 | Japan . |
| 63-190146 | 8/1988 | Japan . |

OTHER PUBLICATIONS

Metals Handbook, Desktop Edition pp. 15–24.
Japanese Patent Appln. No. 58-235011, Laid open Publication No. 60-128253 Jul. 1985.
Japanese Patent Appln. No. 60-62045, Laid open Publication No. 61-223188 Oct. 1986.

*Primary Examiner*—Paula A. Bradley
*Assistant Examiner*—Rex E. Pelto
*Attorney, Agent, or Firm*—Dvorak and Traub

[57] ABSTRACT

A continuously cast slab of Fe-Ni series alloy comprising 30–50 wt % of Ni or further 0.001–0.03 wt % of B and the balance of Fe is controlled to an eqiaxial crystal ratio of 20% or 30% in accordance with the existence or nonexistence of B content in the continuous casting and, if necessary, subjected to an electromagnetic stirring treatment or the like for controlling the eqiaxial crystal ratio and then heated at a temperature of not lower than 950° C., 1000° C. and 1100° C. to economically produce Fe-Ni series alloys having improved effect for restraining streaks during etching.

5 Claims, No Drawings

METHOD OF PRODUCING FE-NI SERIES ALLOYS HAVING IMPROVED EFFECT FOR RESTRAINING STREAKS DURING ETCHING

This application is a continuation of application Ser. No. 389,991, filed Aug. 7, 1989, now abandoned.

BACKGROUND OF THE INVENTION

1. Field of the Invention

This invention relates to a method of producing Fe-Ni series alloys having an improved effect of restraining streaks during the etching, and more particularly to a method of producing Fe-Ni series alloys suitable as a material for use in an electronic equipment such as a shadow mask for color television cathode tube, an electron-ray indicator tube or the like.

2. Related Art Statement

Iron-nickel series alloys (hereinafter abbreviated as Fe-Ni alloy) used as a material for a shadow mask of a color television cathode tube are pointed out to have a drawback that a white stringer pattern or so-called streak is caused in the production of the shadow mask through photoetching.

As a technique for restraining the streaks during the etching, there have hitherto been proposed the following methods. For example, Japanese Patent laid open No. 60-128,253 discloses a method of controlling the occurrence of streaks, wherein an ingot is usually heated above 850° C. and forged at a total sectional reduction ratio of not less than 40% per one heat to mitigate the segregation portion of nickel.

Furthermore, Japanese Patent laid open No. 61-223,188 discloses a method of restraining the occurrence of streaks, wherein the segregation ratio of nickel and the segregation zone thereof are controlled by the prevention of segregation in the production of ingots or by subjecting the nickel to a diffusion treatment through a heat treatment in the production step of bars.

However, the conventional technique disclosed in Japanese Patent laid open No. 60-128,253 is concerned with a method of conducting the forging at the total sectional reduction ratio of more than 40%, but the segregation of various elements cannot be substantially restrained since such a forging is under an usually used loading. As a result, it is not possible to prevent the occurrence of streaks during the etching.

On the other hand, the technique disclosed in Japanese Patent laid open No. 61-223,188 shows a method of mitigating the component segregation through the diffusion of Ni based on high-temperature heat treatment. However, since the sheet thickness is thin as compared with the case of heating at the slab stage, the oxidation loss becomes relatively large and the yield is considerably and undesirably lowered.

In these techniques, the ingot is usually used as a starting material. Now, the solidification structure of the starting material does not come into problem, but the yield of a product is low and the cost is high since the starting material is supplied in form of an ingot.

As mentioned above, these conventional techniques can not completely prevent the occurrence of streaks during the etching, or can not produce cheap products industrially.

SUMMARY OF THE INVENTION

Under the above circumstances, it is an object of the invention to provide Fe-Ni series alloys not causing streaks during the etching.

It is another object of the invention to produce Fe-Ni series alloys with a high yield and a low cost by using a continuously cast material instead of the cast ingot.

The above objects and others of the invention are easily achieved by the following features.

According to a first aspect of the invention, there is a method of producing Fe-Ni series alloys having an improved effect of restraining occurrence of streaks during etching, which method comprises continuously casting a molten metal of Fe-Ni series alloy consisting essentially of 30–50 wt % of Ni and the balance being substantially Fe to form a continuously cast slab having an equiaxial crystal ratio of not more than 30%, and then heating the resulting continuously cast slab at a temperature of not lower than 1100° C. for not less than 1 hour.

In a preferred embodiment of the invention, an alloy consisting of 30–50 wt % of Ni and the balance being substantially Fe is used as an Fe-Ni alloy.

In the continuous casting of Fe-Ni series molten alloy according to the invention, it is preferable that the above molten alloy is subjected to at least one of an electromagnetic stirring treatments, a treatment of regulating the pouring temperature and a supersonic vibration treatment to control the equiaxial crystal ratio to more than 30%.

When heating and holding the continuously cast slab having the controlled eqiaxial crystal ratio of more than 30%, it is preferred that the continuously cast slab be heated and held at a temperature of not lower than 950° C. for not less than 1 hour.

According to a second aspect of the invention, there is the provision of a method of producing Fe-Ni series alloys having an improved effect of restraining occurrence of streaks during etching, which comprises continuously casting a molten metal of Fe-Ni series alloy consisting essentially of 30–50 wt % of Ni, 0.001–0.03 wt % of B and the balance being substantially Fe to form a continuously cast slab having an equiaxial crystal ratio of not more than 20%, and then heating the resulting continuously cast slab at a temperature of not lower than 1000° C. for not less than 1 hour.

In a preferred second embodiment of the second invention, an alloy consisting of 30–50 wt % of Ni, 0.001–0.03 wt % of B and the balance being substantially Fe is used as an Fe-Ni alloy.

In the continuous casting of Fe-Ni series molten alloy according to the invention, it is preferable that the above molten alloy is subjected to at least one of an electromagnetic stirring treatments, a treatment of the regulating the pouring temperature and a supersonic vibration treatment to control the equiaxial crystal ratio to more than 20%.

When heating and holding the continuously cast slab having the controlled eqiaxial crystal ratio of more than 20%, it is desirable that the continuously cast slab be heated and held at a temperature of not lower than 950° C. for not less than 1 hour.

The above structures of the invention and other objects thereof will be more clarified from the following description and examples.

DESCRIPTION OF THE PREFERRED EMBODIMENTS

The inventors have made studies on the occurrence of streaks in the Fe-Ni series alloys and confirmed that main causes of the streak are as follows:

① segregation of impurity elements such as C, Si, Mn, Cr and the like; and

② differences of crystal structure.

That is, the segregated portions of impurity elements such as C, Si, Mn, Cr and the like change the etching rate as compared with the other portions, which produce a difference in the hole shape formed during the photoetching, and therefore result in the occurrence of streaks.

On the other hand, as to the differences of crystal structure, for example, portions largely orienting (100) plane are fast in the etching rate as compared with the other portions, which produces the differences in the hole shape formed during the photoetching. This is due to the presence of solidification structure during the forging or columnar structure having a particular orientation. That is, the columnar structure produced during the forging is stretched in the rolling direction without disappearance at the subsequent working and heat treatment stages retain as the B is, which finally results in the occurrence of streaks.

Under the above circumstances, according to the invention, it has been attempted to overcome the aforementioned problems by not only restraining the component segregation but also regulating the crystal structure.

As the means for overcoming the above problems, according to the invention, Fe-Ni series alloys having an improved effect of restraining the occurrence of streaks during the etching have been produced by heating and holding a continuously cast slab of Fe-Ni series alloy having an equiaxial crystal ratio of not more than 30% at a temperature of not lower than 1100° C. for not less than 1 hour, or by heating and holding a continuously cast slab of Fe-Ni series alloy having an equiaxial crystal ratio of more than 30% at a temperature of not lower than 950° C. for not less than 1 hour.

As a result of the inventors' knowledge, it has been confirmed that when B is used as an additive component to the Fe-Ni series alloy, the B has an effect of cutting the columnar structure in the slab heating and promoting its randomization. That is, according to the invention, it has been attempted to overcome the above problems by not only restraining the component segregation but also regulating the crystal structure through synergistic effect with the addition of B.

In case of alloys added with B, the growth of columnar crystal changes, is restrained by the addition of B, so that it is desirable to change the heating temperature around the eqiaxial crystal ratio of 20%.

Furthermore, according to the invention, the control of the above equaxial crystal ratio has been carried out by ① a treatment that molten metal in a mold in the continuous casting or molten metal in the cast slab of secondary cooling zone is subjected to an electromagnetic stirring;

② a treatment that, after the molten metal is poured into the mold, the pouring temperature is controlled; or ③ a treatment that supersonic vibrations are applied to the molten metal in the mold or the molten metal in the cast slab of the secondary cooling zone.

The invention will be described in detail below.

In the invention, the reason why the lower limit of Ni amount as a starting material is 30 wt % is due to the fact that when the Fe-Ni series alloy is used as the aforementioned functional material, the Ni amount is less than 30 wt %, sufficient electromagnetic proporties have not developed. On the other hand, when the Ni amount exceeds 80 wt %, the quality of the electronic or electromagnetic material is degraded.

Moreover, it is preferable to use Fe-Ni series alloys containing not more than 50 wt % of Ni as a material affected by the photoetching.

Further, B is an important element for developing the properties of the Fe-Ni series alloy according to the invention, the Belement not only prevents the segregation of impurity element such as C, Si, Mn, Cr or the like into crystal grain boundary but also preferentially agglomerates them into a crystal grain boundary or other defective portion to form a nucleus for recrystallization, whereby the crystal grains are finely divided to improve the equiaxial crystal ratio. However, when the B amount is less than 0.001 wt %, this action is insufficient. As the B amount increases, a remarkable effect is developed, but when it exceeds 0.03 wt %, various borides containing C, O, and N are produced in addition to intermetallic compound of $M_2B$(Ni, Cr, Fe) and consequently the risk of causing solidification cracking at high temperature becomes higher, so that the upper limit should be 0.03 wt %.

The starting material of Fe-Ni series alloy adopted in the invention is not an ingot but is a continuously cast slab. The reason why the starting material is limited to the continuously cast slab is based on the fact that the component segregation is macroscopically small and the working and heat treating properties are excellent as compared with the ingot.

In the case of the continuously cast slab, the crystal structure in section of the cast slab is small in the segregation owing to the development of a columnar crystal from both sides, but the following phenomenon is inversely observed aiming at the streak.

That is, it has been confirmed that the occurrence of streaks results from the fact that the columnar crystal produced during the casting is elongated in the rolling direction by the rolling without disappearance by the subsequent working and heat treating stages. Furthermore, according to the inventors' studies, when the length of the columnar crystal having a particular orientation by working up to a final sheet gauge is short, the width and length of the columnar crystal becomes relatively small, and consequently the partial difference in the etching rate during the etching is not observed and the continuous streaks are not formed. While, when the length of the columnar crystal (crystal grain) is long, the width and length remain as they are even after the working, which form the streaks in the etching. The length of the columnar crystal affecting the occurrence of streaks is critical when the equiaixal crystal ratio of the cast slab is 30% or 20% (in case of B-containing alloy).

According to the invention, there are provided heat treating methods suitable for the equiaxial crystal ratios of 30% in case of the alloy containing no B and 20% in case of the B-containing alloy as a method of overcoming the above problems, whereby the occurrence of streaks is prevented.

Next, the heat treating temperature of the slab is different in the alloy containing no B and the B-containing alloy.

The criterion of this temperature is 1100° C. in case of the alloy containing no B and 1000° C. in case of the B-containing alloy. The reason why the heat treating temperature of the slab is not lower than 1100° C. or 1000° C. is due to the fact that the continuously cast slab having an equiaxial crystal ratio of not more than 30% in case of the alloy containing no B or not more than 20% in case of the B-containing alloy is strongly influenced by the columnar crystal having a stable orientation and the temperature of lower than 1100° C. or 1000° C. is insufficient to cut such a columnar crystal for randomization.

On the contrary, when the equiaxial crystal ratio of the slab exceeds 30% or 20%, there is no existence of a columnar crystal after the hot rolling, and consequently the chance of causing the streaks is lower. When the alloy does not contain B or contains B, the heat treating temperature may be a low level of 950° C. However, when the heat treating temperature is lower than 950° C., the mitigation of segregation is not sufficiently conducted, and the occurrence of streaks is caused based on such a segregation.

Moreover, according to the invention, the electromagnetic force is regulated by arranging an electromagnetic stirrer (EMS) in a mold for a continuous casting machine or a secondary cooling zone thereof as a most effective method of controlling the equiaxial crystal ratio of the aforementioned continuously cast slab, whereby the unsolidified molten metal in the cast slab is stirred to control the equiaxial crystal ratio to the given value. As previously mentioned, the equiaixal crystal ratio can be controlled to the given value by the control of the pouring temperature or by supersonic vibrations.

As mentioned above, according to the invention, the crystal homogenization and mitigation of component segregation in the Fe-Ni series alloys can simultaneously be achieved by controlling the solidification in the continuous casting and subjecting the continuously cast slab to a proper heat treatment. According to the invention, therefore, Fe-Ni series alloys having no occurrence of streaks in the etching can be produced.

The following examples are given in illustration of the invention and are not intended as limitations thereof.

EXAMPLE 1

The following Table 1 shows production conditions such as chemical composition of Fe-Ni series alloy used in this example, equiaxial crystal ratio and the like as well as results thereof.

As the alloy particularly shown in Table 1 and aiming at the invention, metal melted in an electric furnace was refined by AOD process or VOD process and then forged in a continuously forging machine while being actuated by an electromagnetic stirrer accompanied therewith to control the equiaxial crystal ratio, whereby a given continuously cast slab as shown in Table 1 was obtained.

Next, the continuously cast slab was cooled and worked, which slab was heated and held at a temperature of not lower than 950° C. for not less than 1 hour and thereafter hot rolled to form a coil having a thickness of 5.5 mm. After the hot rolling, the coil was subjected to a proper combination of cold rolling and heat treatment in the usual manner to obtain a final product.

Thus, the obtained test sample was pierced by actual photoetching with a solution of ferric chloride (specific gravity: 1.45, 50° C.) and the occurrence of streaks was examined. The results are shown in Table 1.

As seen from the data of Table 1, in the Fe-Ni series alloys produced according to the method of the invention, the occurrence of streaks in the etching was not substantially observed as compared with the usual ingot of Fe-Ni series alloy having the same composition and produced by the conventional method (Comparative Example). It is clear that these alloys are excellent alloys used as a starting material for etching.

TABLE 1

| | No. | Chemical composition (wt %) Fe | Ni | Equiaxial crystal ratio (%) | Heat treating temperature of slab (°C.) | Heating time (hr) | Existence or non-existence |
|---|---|---|---|---|---|---|---|
| Acceptable Example | 1 | balance | 35.9 | 0 | 1200 | 4 | non-existence |
| | 2 | | 36.1 | 30 | 1100 | 6 | |
| | 3 | | 36.1 | 40 | 1000 | 6 | |
| | 4 | | 42.1 | 35 | 950 | 8 | |
| | 5 | | 41.7 | 45 | 950 | 8 | |
| | 6 | | 50.1 | 0 | 1100 | 6 | |
| | 7 | | 50.1 | 40 | 950 | 6 | |
| Comparative Example | 8 | balance | 35.9 | 0 | 1000 | 8 | existence |
| | 9 | | 36.1 | 30 | 900 | 8 | |
| | 10 | | 42.1 | 35 | 900 | 6 | |
| | 11 | | 41.7 | 45 | — | — | |
| | 12 | | 50.1 | 0 | 1000 | 10 | |

EXAMPLE 2

The following Table 2 shows production conditions such as chemical composition of Fe-Ni series alloy used in this example, equiaxial crystal ratio and the like as well as results thereof.

As the B-containing alloys particularly shown in Table 2 and aiming at the invention (No. 13–No. 18), metal melted in an electric furnace was refined by AOD process or VOD process and then forged in a continuously forging machine while being actuated by an electromagnetic stirring device accompanied therewith to control the equiaxial crystal ratio, whereby a given continuously cast slab as shown in Table 2 was obtained.

Next, the continuously cast slab was cooled and worked, which slab was heated and held at a temperature of not lower than 950° C. for not less than 1 hour and thereafter hot rolled to form a coil having a thickness of 5.5 mm. After the hot rolling, the coil was subjected to a proper combination of cold rolling and heat treatment in the usual manner to obtain a final product.

Thus, the obtained test sample was pierced by actual photoetching with a solution of ferric chloride (specific gravity: 1.45, 50° C.) and the occurrence of streaks was examined. The results are shown in Table 2.

As seen from the data of Table 2, in the Fe-Ni series alloys produced according to the method of the invention, the occurrence of streaks during the etching was not substantially observed as compared with the usual ingot of Fe-Ni series alloys having the same composition and produced by the conventional method (Comparative Examples Nos. 19–22). It is clear that these alloys are excellent alloys used as a starting material for etching.

TABLE 2

| | No. | Chemical composition (wt %) | | | Equi-axial crystal ratio (%) | Heat treating temperature of slab (°C.) | Heating time (hr) | Existence or non-existence |
|---|---|---|---|---|---|---|---|---|
| | | Fe | Ni | B | | | | |
| Acceptable Example | 13 | balance | 35.9 | 0.011 | 0 | 1000 | 4 | non-existence |
| | 14 | | 36.1 | 0.008 | 22 | 950 | 4 | |
| | 15 | | 35.5 | 0.019 | 35 | 1100 | 6 | |
| | 16 | | 42.0 | 0.010 | 0 | 1000 | 4 | |
| | 17 | | 41.8 | 0.008 | 25 | 1000 | 4 | |
| | 18 | | 50.1 | 0.009 | 30 | 1000 | 4 | |
| Comparative Example | 19 | balance | 35.9 | 0.0009 | 0 | 1000 | 6 | existence |
| | 20 | | 36.0 | — | 30 | 900 | 4 | |
| | 21 | | 41.7 | — | 45 | 900 | 6 | |
| | 22 | | 50.5 | — | 20 | 1000 | 4 | |

As mentioned above, the Fe-Ni series alloys produced according to the method of the invention have no streaks after the photoetching, so that the invention can cheaply provide Fe-Ni series alloys having properties desired as electronic or electromagnetic material.

Moreover, the Fe-Ni series alloys according to the invention are applied as a continuously cast slab of Fe-Ni series alloy such as 36Ni invar alloy for a shadow mask, 42Ni alloy for a lead frame, Fe-Ni series alloy for an electron and electromagnetic use aiming at low thermal expansion properties and magnetic properties, permalloy used as as electromagnetic material and the like.

What is claimed is:

1. A method of producing Fe-Ni series alloys for use in a shadow mask for a cathode tube, having an improved effect of restraining streaks during etching, which comprises continuously casting a molten metal of Fe-Ni series alloy consisting essentially of 30–50 wt % of Ni, 0.001–0.03 wt % of B and the balance being substantially Fe to form a continuously cast slab having not more than a 20% equiaxial crystal structure, and then heating the resulting continuously cast slab at a temperature of not lower than 1000° C. for not less than 1 hour.

2. The method according to claim 1, wherein said Fe-Ni alloy consists of 30–50 wt % of Ni, 0.001–0.03 wt % of B and the balance being substantially Fe.

3. A method of producing Fe-Ni series alloys for use in a shadow mask for a cathode tube, having an improved effect of restraining streaks during etching, which comprises continuously casting a molten metal of Fe-Ni series alloy consisting essentially of 30–50 wt % of Ni, 0.001–0.03 wt % of B and the balance being substantially Fe to form a continuously cast slab having more than a 20% equiaxial crystal structure, and then heating the resulting continuously cast slab at a temperature of not lower than 1000° C. for not less than 1 hour.

4. The method according to claim 3, wherein said molten metal of Fe-Ni alloy is subjected to at least one treatment selected from electromagnetic stirring treatment, treatment of regulating a pouring temperature and supersonic wave vibration treatment to thereby control said equiaxial crystal structure of the continuously cast slab to more than 20%.

5. The method according to claim 4, wherein said continuously cast slab after said equiaxial crystal structure is controlled to more than 20% is heated and held at a temperature of not lower than 950° C. for not less than 1 hour.

* * * * *